(12) United States Patent
Kolodner et al.

(10) Patent No.: US 11,121,913 B2
(45) Date of Patent: Sep. 14, 2021

(54) METHOD FOR FINDING FAILING COMPONENTS IN A LARGE DISTRIBUTED STORAGE SYSTEM CONNECTIVITY

(71) Applicant: International Business Machines Corporation, Armonk, NY (US)

(72) Inventors: Elliot Karl Kolodner, Haifa (IL); Anna Levin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 16/419,058

(22) Filed: May 22, 2019

(65) Prior Publication Data

US 2020/0374182 A1    Nov. 26, 2020

(51) Int. Cl.
*H04L 12/24* (2006.01)
*H04L 12/26* (2006.01)
*H04L 29/08* (2006.01)

(52) U.S. Cl.
CPC ........ *H04L 41/0677* (2013.01); *H04L 43/045* (2013.01); *H04L 43/0811* (2013.01); *H04L 67/1097* (2013.01)

(58) Field of Classification Search
CPC .......................... H04L 41/0677; H04L 43/045

USPC ........................................................ 709/224
See application file for complete search history.

(56) References Cited

U.S. PATENT DOCUMENTS

| | | | |
|---|---|---|---|
| 9,122,602 B1 | 9/2015 | Jewell et al. | |
| 10,133,619 B1* | 11/2018 | Nagpal | ............... G06F 11/0787 |
| 2014/0129320 A1* | 5/2014 | Jebara | ..................... G06Q 30/00 |
| | | | 705/14.42 |
| 2014/0136684 A1 | 5/2014 | Jain et al. | |
| 2014/0365422 A1 | 12/2014 | Hampapur et al. | |
| 2017/0068581 A1* | 3/2017 | Qi | ....................... H04L 41/5009 |
| 2019/0005534 A1* | 1/2019 | Cummings | ........ G06Q 30/0243 |

* cited by examiner

*Primary Examiner* — Moustafa M Meky
*Assistant Examiner* — Sm Z Islam
(74) *Attorney, Agent, or Firm* — Gregory J. Kirsch

(57) ABSTRACT

Embodiments of the present systems and methods may provide techniques for finding failing components in a distributed storage system. For example a method may comprise measuring problems and health of a plurality of physical and logical components in a distributed storage system, the plurality of physical and logical components forming nodes of the distributed storage system, and generating a graph of the nodes organized in a plurality of hierarchical levels, generating, for each node in the graph, a score summarizing the measured problems and health of the node, determining a highest score at a highest hierarchical level of the graph and determining the associated node as a failing component at a most significant level.

17 Claims, 4 Drawing Sheets

METHOD FOR FINDING FAILING COMPONENTS IN A LARGE DISTRIBUTED STORAGE SYSTEM CONNECTIVITY

BACKGROUND

The present invention relates to techniques that provide the capability to find failing components in a distributed storage system.

Large distributed storage systems deployed in geographically dispersed environments, such as cloud storage services deployed in the cloud, have become quite common. From the network infrastructure perspective, such a system consists of numerous endpoints (servers) connected to the network access layer through network devices, such as Top of Rack (ToR) switches. Further internetwork connectivity traverses datacenter networks, which in turn are connected by cross-datacenter links and in some cases by trans-continental backbone networks. The exact underlying network links and devices at the network core layers are typically not known to the storage application owners.

Problems may arise when failures occur in the network infrastructure. For example, one step in dealing with a failure is determining the point of failure in the storage system connectivity at the highest level of network hierarchy. This step may be difficult when the connectivity information available is limited to the network application layer connectivity, such as connectivity metrics collected by the endpoints/servers between them. The determination of the point of failure may be important to storage systems operations teams. Similar difficulties may be faced by any other general purpose application owners that face connectivity problems in a hierarchical application deployment with partial knowledge of underlying infrastructure connectivity state.

Accordingly, a need arises for techniques that provide the capability to find failing components in a distributed storage system.

SUMMARY

Embodiments of the present systems and methods may provide techniques for finding failing components in a distributed storage system. The failing component of interest is the one that represents the problem at the highest possible level of aggregation/hierarchy, while representing the most significant failure problem currently occurring in the system. Such a component may be termed a failing component at the most significant level. Embodiments of the present systems and methods may solve the complex problem of finding failing components in a large distributed storage system by representing the system as a flow network in a graph theory domain. The failing components determination problem may be reduced to a problem in hierarchical flow networks in graph theory. This new representation allows the finding of easy solution to the defined problem.

For example, in an embodiment, a method may be implemented in a computer comprising a processor, memory accessible by the processor, and computer program instructions stored in the memory and executable by the processor, the method may comprise measuring problems and health of a plurality of physical and logical components in a distributed storage system, the plurality of physical and logical components forming nodes of the distributed storage system, and generating a graph of the nodes organized in a plurality of hierarchical levels, generating, for each node in the graph, a score summarizing the measured problems and health of the node, determining a highest score at a highest hierarchical level of the graph and determining the associated node as a failing component at a most significant level, and generating a list of additional failing components, the list ordered by a highest score of each successive node at each successive hierarchical level of the graph.

In embodiments, the measuring may comprise measuring metrics relating to connectivity and processing performance of nodes comprising at least one server, network device, datacenter business offering, geographic location, and the distributed storage system as a whole, and connectivity and communication performance of communication links connecting the nodes. The generated score for each node and link may further be a function of scores of nodes and links lower in the hierarchy of the graph. The generated score for each node and link may be any function of the weights of the lower level nodes and links in the hierarchy. For example, the weighting may be based on an average of the lower levels, such as:

$$Weight_{level\ n} = \frac{\sum_{nodes\ in\ level\ n-1} Weight_{level\ n-1}}{\#nodes\ in\ level\ n-1}.$$

In embodiments, determining the highest score at the highest hierarchical may comprise traversing the nodes of the plurality of hierarchical levels of the graph, starting at a highest hierarchical level, determining a node having a score that is greater than or equal to scores of any nodes in a sub-tree of the node at any lower level, and determining that the determined node is a failing component at a most significant level. Generating a list of additional failing components may comprise removing the sub-tree of the failing component from the graph, traversing the remaining nodes of the plurality of hierarchical levels of the graph, starting at a highest hierarchical level, determining a node having a score that is greater than or equal to scores of any nodes in a sub-tree of the node at any lower level, and determining that the determined node is a failing component at that hierarchical level of the graph. The method may further comprise repeating until no nodes having scores indicating problems remain in the graph.

In an embodiment, a system may comprise a processor, memory accessible by the processor, and computer program instructions stored in the memory and executable by the processor to perform measuring problems and health of a plurality of physical and logical components in a distributed storage system, the plurality of physical and logical components forming nodes of the distributed storage system, and generating a graph of the nodes organized in a plurality of hierarchical levels, generating, for each node in the graph, a score summarizing the measured problems and health of the node, determining a highest score at a highest hierarchical level of the graph and determining the associated node as a failing component at a most significant level, and generating a list of additional failing components, the list ordered by a highest score of each successive node at each successive hierarchical level of the graph.

In an embodiment, a computer program product may comprise a non-transitory computer readable storage having program instructions embodied therewith, the program instructions executable by a computer, to cause the computer to perform a method comprising measuring problems and health of a plurality of physical and logical components in a distributed storage system, the plurality of physical and logical components forming nodes of the distributed storage system, and generating a graph of the nodes organized in a plurality of hierarchical levels, generating, for each node in the graph, a score summarizing the measured problems and health of the node, determining a highest score at a highest hierarchical level of the graph and determining the associated node as a failing component at a most significant level, and generating a list of additional failing components, the list ordered by a highest score of each successive node at each successive hierarchical level of the graph.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide techniques for finding failing components in a large distributed storage system. The failing component of interest is the one that represents the problem at the highest possible level of aggregation/hierarchy, while representing the most significant failure problem currently occurring in the system. Such a component may be termed a failing component at the most significant level. Embodiments of the present systems and methods may solve the complex problem of finding failing components in a large distributed storage system by representing the system as a flow network in a graph theory domain. The failing components determination problem may be reduced to a problem in hierarchical flow networks in graph theory. This new representation allows the finding of easy solution to the defined problem.

Figure 1:
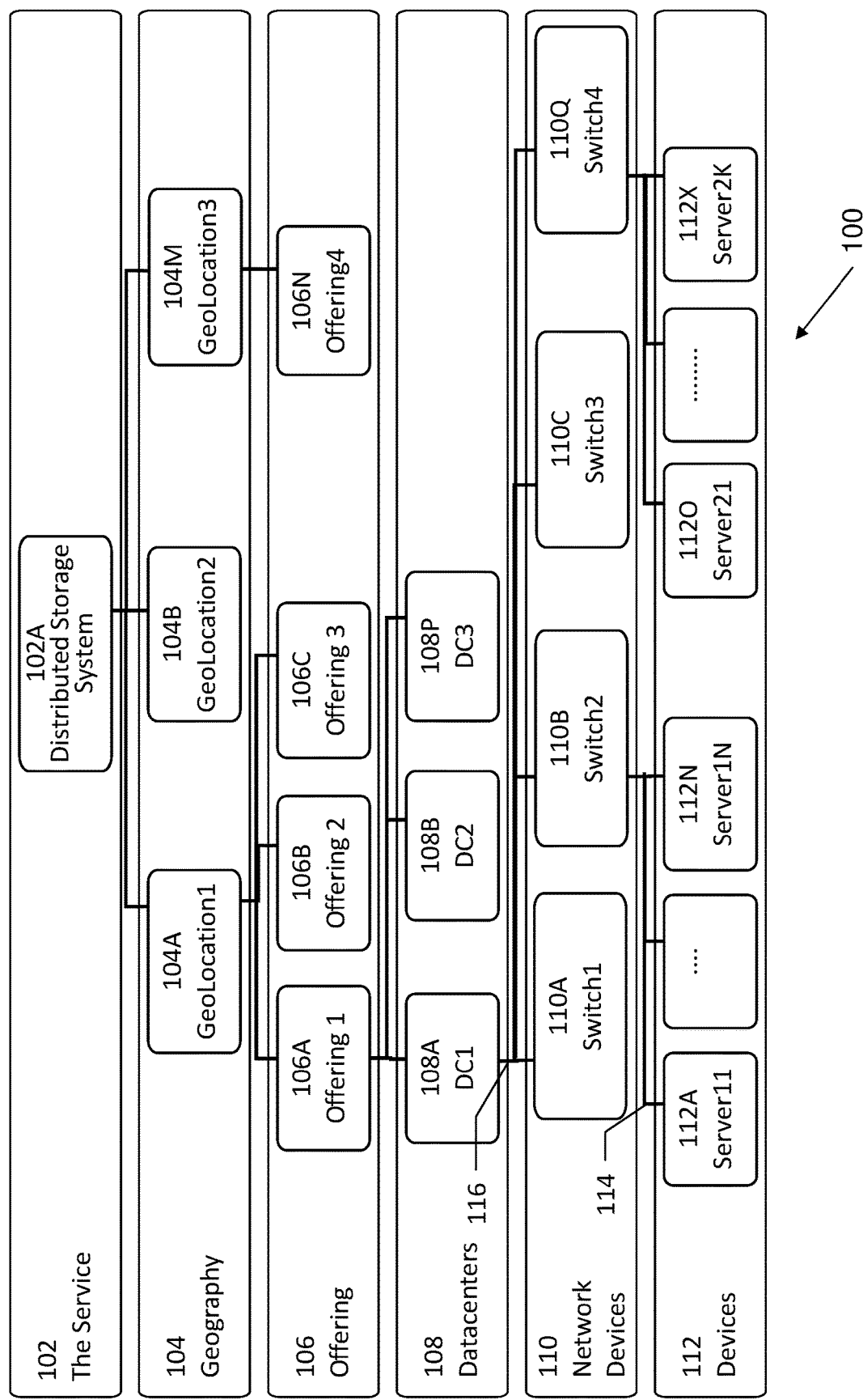
FIG. 1 illustrates an exemplary block diagram of a hierarchical flow network representation of a distributed storage system according to embodiments of the present systems and methods.

An exemplary block diagram of a hierarchical flow network representation of a distributed storage system 100 according to embodiments of the present systems and methods is shown in FIG. 1. In this example, system 100 may include a plurality of levels, such as the service level 102, geography level 104, offerings level 106, datacenters level 108, network devices level 110, and devices level 112. Devices level 112 may include a plurality of physical or logical devices on the network, such as servers 112A-N and servers 112O-X, which may provide the actual storage for system 100. Network devices level 110 may include a plurality of network devices communicatively connecting devices 112A-Q, such as ToR switches 110A-Q, which may provide communication switching among devices 112A-Q. Datacenters level 108 may include a plurality of datacenter gateways, such as datacenter gateways 108A-P, each of which may connect to a plurality of network devices 110A-Q and devices 112A-Q communicatively connected to form a whole physical or logical entity for storing and providing data. Offering level 106 may include a plurality of business offerings, such as offerings 106A-N, each of which may include logical or physical combinations of datacenters 108A-P, and their constituent network devices 110A-Q and devices 112A-Q, to form a unified arrangement of data storage and provision. Geography level 104 may include a plurality of geolocations, such as geolocations 104A-M, which may be distinct logical or physical geographic locations, each of which may include one or more offerings 106 or arrangements of offerings, as well as the constituent components, datacenters 108A-P, network devices 110A-Q, and devices 112A-Q. Service level 102 may include one or more distributed storage systems 102A, which may represent a unified logical or physical system.

Figure 2:
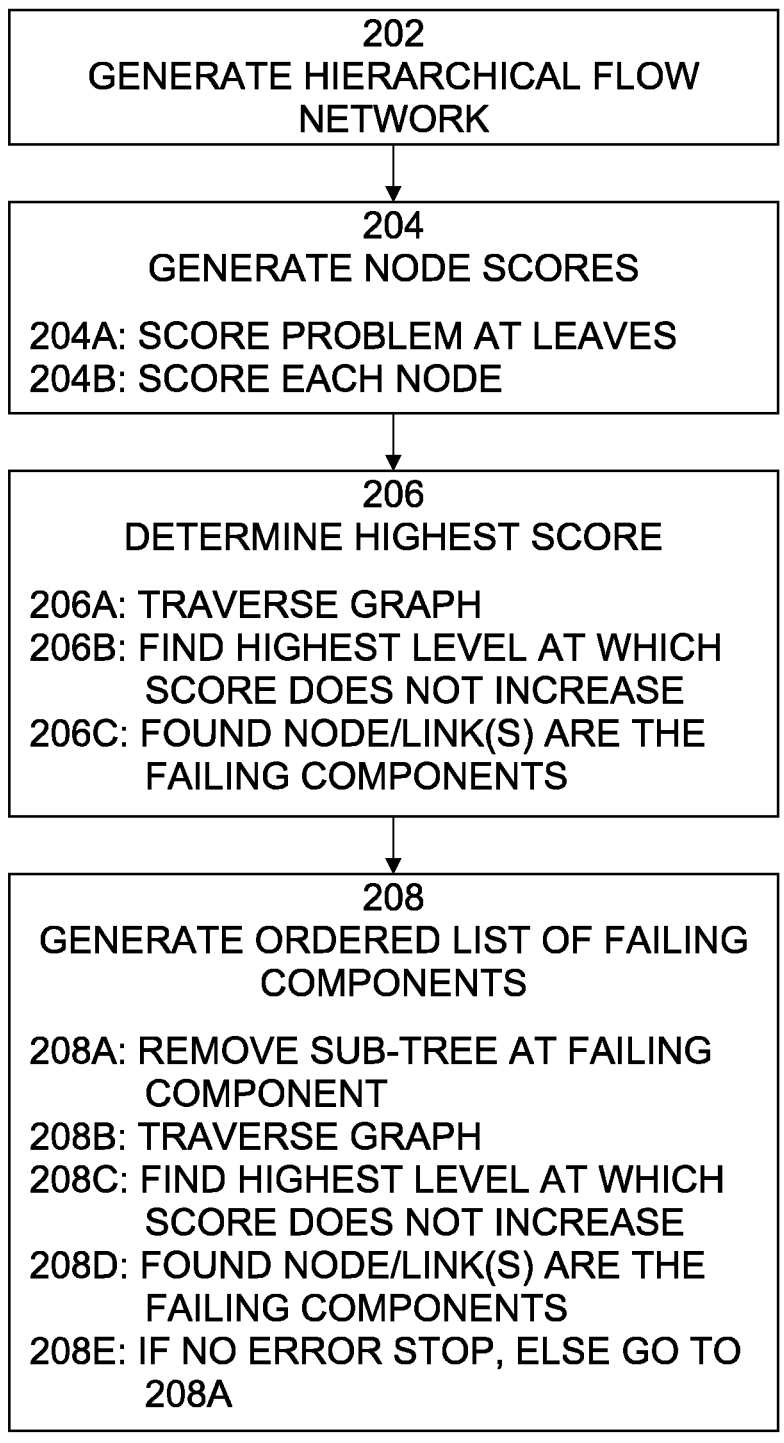
FIG. 2 is an exemplary flow diagram of a process according to embodiments of the present techniques.

An exemplary flow diagram of a process 200, according to embodiments of the present techniques, is shown in FIG. 2. It is best viewed in conjunction with FIGS. 1 and 3. Process 200 begins with 202, in which a hierarchical flow network representation, such as that shown in FIG. 1, of a distributed storage system 100, may be generated. In the representation, data sources and sinks are the actual storage nodes/servers, such as devices 112A-Q. Examples of such devices 112A-Q may include SLICESTOR® nodes, which are devices, such as a server or a virtual machine, that are used to store object data, and ACCESSER® nodes, which are devices, such as a server or a virtual machine, that are used to access the SLICESTOR® nodes in IBM® Cloud Object Storage. The rest of the nodes in the flow network may be the physical/logical topology aggregation entities, such as ToR switches, clusters of switches, datacenters, business offerings, geographical locations, etc. Storage nodes, servers 112A-Q, may be positioned at the lowest level of hierarchy, devices level 112, as leaves of the deployment tree of system 100. Further, links may connect the entities. For example, one or more virtual links or paths may connect each nodes in the hierarchy, such as links 114 connecting servers (devices 112A-Q) to switches (network devices 110A-Q) and paths 116 connecting switches (network devices 110A-Q) to datacenter gateways 108A-P.

Figure 3:
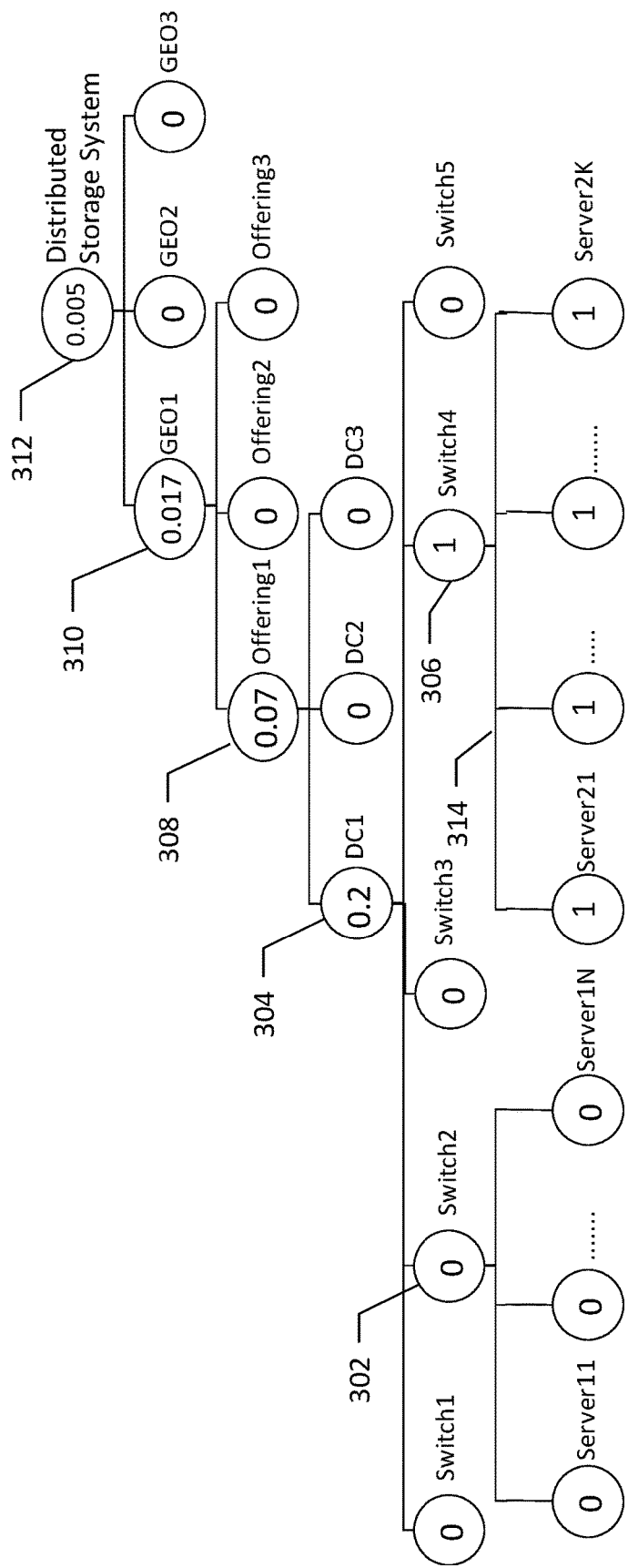
FIG. 3 is an exemplary block diagram of an example of processing in a hierarchical flow network according to embodiments of the present systems and methods.

At 204, node scores may be generated. For example, at 204A, for each node at each level 102-112, connectivity and other performance metrics may be measured to determine the presence or absence of problems and the health of each node and its associated links. A score summarizing the problems and health of each node/link, may be generated for each node, which, as mentioned above, form the leaves of the deployment tree of system 100. For example, the greater the problems and/or worse the health of the node/link, the higher the score may be. For example, as shown in FIG. 3, node 302 may have a score of 0, indicating no problems, while node 304 may have a score of 0.2, which does indicate a problem. As servers 112A-Q are at the lowest level, device level 112, of the hierarchy, the score for each servers 112A-Q may be determined, for example, according to:

$$Weight_{Server} = \frac{\#Connectivity\ Issues}{\#Connectivity Issues + \#Connectivity\ Success}$$

At 204B, each node/link may further be scored as a function of scores of the nodes/links further down the hierarchy. The weighting may be any function of the scores of the lower level nodes/links. For example, for each node, the average score of the children of that node/link, that is the average score of the leaves in the subtree of the node/link, may be determined. For example, as shown in FIG. 3, the score for each switch 110A-Q may be determined according to:

$$Weight_{Switch} = \frac{\sum_{ConnectedServers} Weight_{Server}}{\#ConnectedServers}$$

and similarly for higher levels. This may be generalized to:

$$Weight_{level\ n} = \frac{\sum_{nodes\ in\ level\ n-1} Weight_{level\ n-1}}{\#nodes\ in\ level\ n-1}$$

For example, as shown in FIG. 3, the servers connected to switch 306 all have scores of 1, which yields a score for switch 306 of 1. Datacenter 304 has five connected switches, four with scores of 0 and one with a score of 1, which yields a score for data center 304 of 0.2.

At 206, the highest score at the highest hierarchy level may be determined. This score is associated with the failing component that is at the most significant level in the hierarchy. For example, at 206A, the graph of the hierarchy may be traversed starting from the root node, distributed storage system 102A, at service level 102. At 206B, the highest level at which the score is not getting higher when going down the tree may be found. That is, there may be a level in the hierarchy at which, for example, the score of the node at that level is greater than or equal to the scores of any nodes in the sub-tree of the node at any lower level. For example, as shown in FIG. 3, the root node 312 has a score of 0.005, the geographic level node 310 has a score of 0.017, the offering level node 308 has a score of 0.07, the datacenter level node 304 has a score of 0.2, the switch level node 306 has a score of 1, and all the server level nodes 314 have scores of 1. Thus, switch level node 306 is the node at that highest level of the hierarchy at which the score in not getting higher. At 206C, it may be determined that the node/link or group of nodes and their links are the failing component at the most significant level. For example, as shown in FIG. 3, switch level node 306 may be determined to be the failing component at the most significant level.

At 208, an ordered list of failing components may be generated. For example, the ordered list of failing components may be ordered by their error significance and level of hierarchy. To generate such a list, at 208A, the sub-tree rooted at the failing component found 206C may be removed. At 208B, the graph may be traversed starting from the root node, distributed storage system 102A, at service level 102. At 208C, the highest level at which the score is not getting higher when going down the tree may be found. At 208D, it may be determined that the node/link or group of nodes and their links are the failing component(s) at the next most significant level. At 208E, the process 208 may be repeated starting at 208A as long as additional nodes/links with problems or errors are found. When no further problems or errors are found, the process may stop. For example, as shown in FIG. 3, the ordered list may be as follows: switch level node 306 as the failing component at the most significant level, then datacenter level node 304, then offering level node 308, then geographic level node 310, and finally root node 312.

Figure 4:
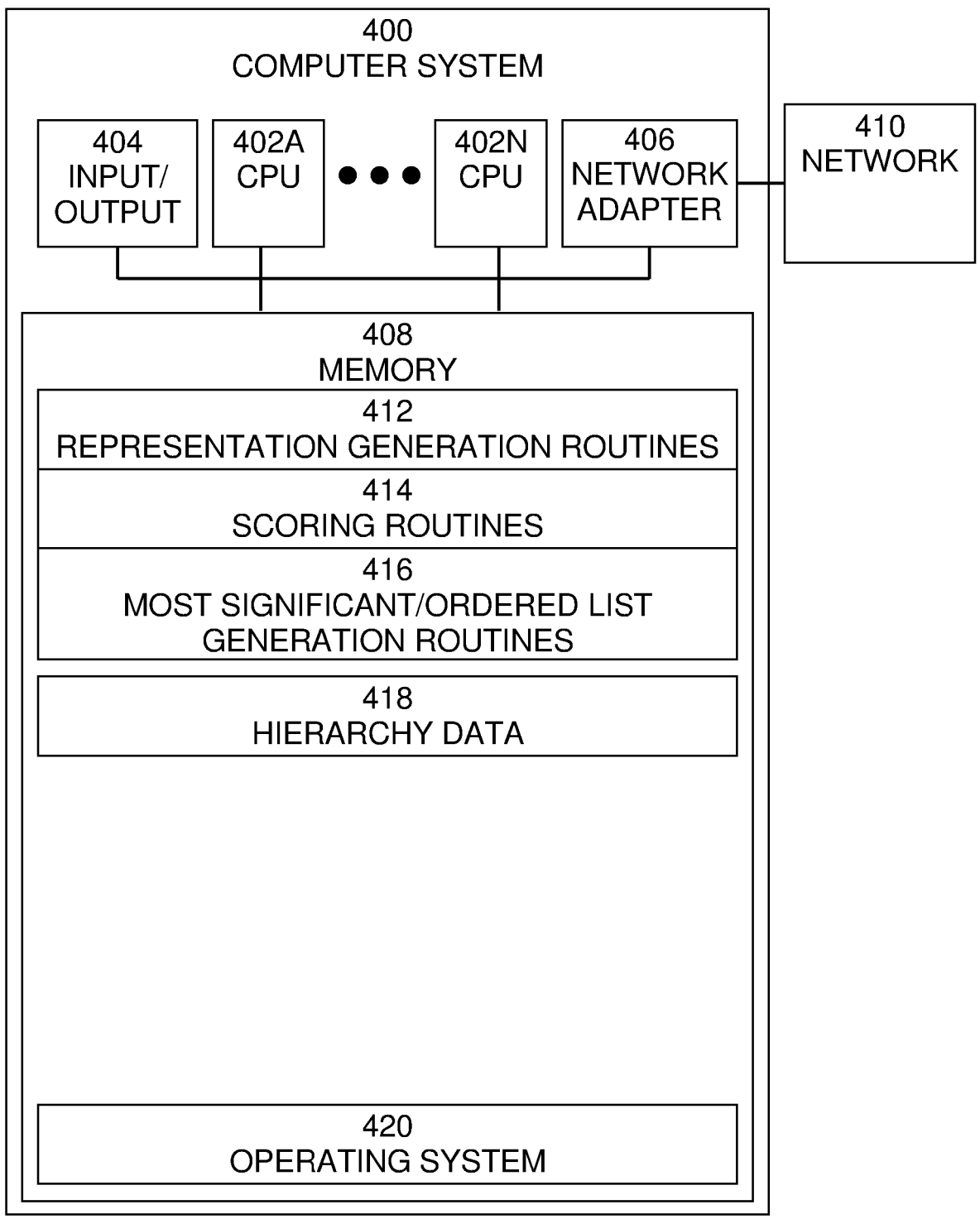
FIG. 4 is an exemplary block diagram of a computer system, in which processes involved in the embodiments described herein may be implemented.

An exemplary block diagram of a computer system 402, in which processes involved in the embodiments described herein may be implemented, is shown in FIG. 4. Computer system 402 may be implemented using one or more programmed general-purpose computer systems, such as embedded processors, systems on a chip, personal computers, workstations, server systems, and minicomputers or mainframe computers, or in distributed, networked computing environments. Computer system 402 may include one or more processors (CPUs) 402A-402N, input/output circuitry 404, network adapter 406, and memory 408. CPUs 402A-402N execute program instructions in order to carry out the functions of the present communications systems and methods. Typically, CPUs 402A-402N are one or more microprocessors, such as an INTEL CORE® processor. FIG. 4 illustrates an embodiment in which computer system 402 is implemented as a single multi-processor computer system, in which multiple processors 402A-402N share system resources, such as memory 408, input/output circuitry 404, and network adapter 406. However, the present communications systems and methods also include embodiments in which computer system 402 is implemented as a plurality of networked computer systems, which may be single-processor computer systems, multi-processor computer systems, or a mix thereof.

Input/output circuitry 404 provides the capability to input data to, or output data from, computer system 402. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 406 interfaces device 400 with a network 410. Network 410 may be any public or proprietary LAN or WAN, including, but not limited to the Internet.

Memory 408 stores program instructions that are executed by, and data that are used and processed by, CPU 402 to perform the functions of computer system 402. Memory 408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 408 may vary depending upon the function that computer system 402 is programmed to perform. In the example shown in FIG. 4, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 4, memory 408 may include representation generation routines 412, scoring routines 414, most significant/ordered list generation routines 416, hierarchy data 418, and operating system 420. Representation generation routines 412 may include software routines to perform generate a hierarchical flow network representation of a distributed storage system, as described above. The generated representation may be stored as hierarchy data 418. Scoring routines 414 may include software routines to measure connectivity and other performance metrics to determine the presence or absence of problems and the health of each node and its associated links and to generate scores score summarizing the problems and health of each node/link and further as a function of the nodes/links further down the hierarchy, as described above. Most significant/ordered list generation routines 416 may include software routines to perform determine the failing component at the most significant level and to generate ordered list of failing components, as described above. Operating system 420 may provide overall system functionality.

As shown in FIG. 4, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented in a computer comprising a processor, memory accessible by the processor, and computer program instructions stored in the memory and executable by the processor, the method comprising:
    measuring problems and health of a plurality of physical and logical components in a distributed storage system, the plurality of physical and logical components forming nodes of the distributed storage system, and generating a graph of the nodes organized in a plurality of hierarchical levels;
    generating, for each node in the graph, a score summarizing the measured problems and health of the node;
    determining a highest score at a highest hierarchical level of the graph by:
        traversing the nodes of the plurality of hierarchical levels of the graph, starting at a highest hierarchical level,
        determining a node having a score that is greater than or equal to scores of any nodes in a sub-graph of the node at any lower level, and
        determining that the determined node is a failing component at a most significant level; and
    determining an associated node as a failing component at a most significant level.

2. The method of claim 1, further comprising generating a list of additional failing components, the list ordered by a highest score of each successive node at each successive hierarchical level of the graph.

3. The method of claim 1, wherein the measuring comprises measuring metrics relating to connectivity and processing performance of nodes comprising at least one server, network device, datacenter business offering, geographic location, and the distributed storage system as a whole, and connectivity and communication performance of communication links connecting the nodes.

4. The method of claim 3, wherein the generated score for each node and link is further a function of scores of nodes and links lower in the hierarchy of the graph.

5. The method of claim 4, wherein the generated score for each node and link is further determined according to:

$$Weight_{level\ n} = \frac{\sum_{nodes\ in\ level\ n-1} Weight_{level\ n-1}}{\#nodes\ in\ level\ n-1}.$$

6. The method of claim 1, wherein generating a list of additional failing components comprises:
    removing the sub-tree of the failing component from the graph;
    traversing the remaining nodes of the plurality of hierarchical levels of the graph, starting at a highest hierarchical level;
    determining a node having a score that is greater than or equal to scores of any nodes in a sub-tree of the node at any lower level;
    determining that the determined node is a failing component at that hierarchical level of the graph; and
    repeating until no nodes having scores indicating problems remain in the graph.

7. A system comprising a processor, memory accessible by the processor, and computer program instructions stored in the memory and executable by the processor to perform:
    measuring problems and health of a plurality of physical and logical components in a distributed storage system, the plurality of physical and logical components forming nodes of the distributed storage system, and generating a graph of the nodes organized in a plurality of hierarchical levels;
    generating, for each node in the graph, a score summarizing the measured problems and health of the node;
    generating, for each node in the graph, a score summarizing the measured problems and health of the node;
    determining a highest score at a highest hierarchical level of the graph by:
        traversing the nodes of the plurality of hierarchical levels of the graph, starting at a highest hierarchical level,
        determining a node having a score that is greater than or equal to scores of any nodes in a sub-graph of the node at any lower level, and
        determining that the determined node is a failing component at a most significant level; and determining an associated node as a failing component at a most significant level.

8. The system of claim 7, further performing generating a list of additional failing components, the list ordered by a highest score of each successive node at each successive hierarchical level of the graph.

9. The system of claim 8, wherein the generated score for each node and link is further a function of scores of nodes and links lower in the hierarchy of the graph.

10. The system of claim 7, wherein the measuring comprises measuring metrics relating to connectivity and processing performance of nodes comprising at least one server, network device, datacenter business offering, geographic location, and the distributed storage system as a whole, and connectivity and communication performance of communication links connecting the nodes.

11. The system of claim 10, wherein the generated score for each node and link is further determined according to:

$$Weight_{level\ n} = \frac{\sum_{nodes\ in\ level\ n-1} Weight_{level\ n-1}}{\#nodes\ in\ level\ n-1}.$$

12. The system of claim 7, wherein generating a list of additional failing components comprises:
 removing the sub-tree of the failing component from the graph;
 traversing the remaining nodes of the plurality of hierarchical levels of the graph, starting at a highest hierarchical level;
 determining a node having a score that is greater than or equal to scores of any nodes in a sub-tree of the node at any lower level;
 determining that the determined node is a failing component at that hierarchical level of the graph; and
 repeating until no nodes having scores indicating problems remain in the graph.

13. A computer program product comprising a non-transitory computer readable storage having program instructions embodied therewith, the program instructions executable by a computer, to cause the computer to perform a method comprising:
 measuring problems and health of a plurality of physical and logical components in a distributed storage system, the plurality of physical and logical components forming nodes of the distributed storage system, and generating a graph of the nodes organized in a plurality of hierarchical levels;
 generating, for each node in the graph, a score summarizing the measured problems and health of the node;
 determining a highest score at a highest hierarchical level of the graph by:
  traversing the nodes of the plurality of hierarchical levels of the graph, starting at a highest hierarchical level,
  determining a node having a score that is greater than or equal to scores of any nodes in a sub-graph of the node at any lower level, and
  determining that the determined node is a failing component at a most significant level; and
 determining an associated node as a failing component at a most significant level.

14. The computer program product of claim 13, further comprising generating a list of additional failing components, the list ordered by a highest score of each successive node at each successive hierarchical level of the graph.

15. The computer program product of claim 13, wherein the measuring comprises measuring metrics relating to connectivity and processing performance of nodes comprising at least one server, network device, datacenter business offering, geographic location, and the distributed storage system as a whole, and connectivity and communication performance of communication links connecting the nodes.

16. The computer program product of claim 15, wherein the generated score for each node and link is further a function of scores of nodes and links lower in the hierarchy of the graph, wherein the generated score for each node and link is further determined according to:

$$Weight_{level\ n} = \frac{\sum_{nodes\ in\ level\ n-1} Weight_{level\ n-1}}{\#nodes\ in\ level\ n-1}.$$

17. The computer program product of claim 13, wherein generating a list of additional failing components comprises:
 removing the sub-tree of the failing component from the graph;
 traversing the remaining nodes of the plurality of hierarchical levels of the graph, starting at a highest hierarchical level;
 determining a node having a score that is greater than or equal to scores of any nodes in a sub-tree of the node at any lower level;
 determining that the determined node is a failing component at that hierarchical level of the graph; and
 repeating until no nodes having scores indicating problems remain in the graph.

* * * * *